Figure 1:
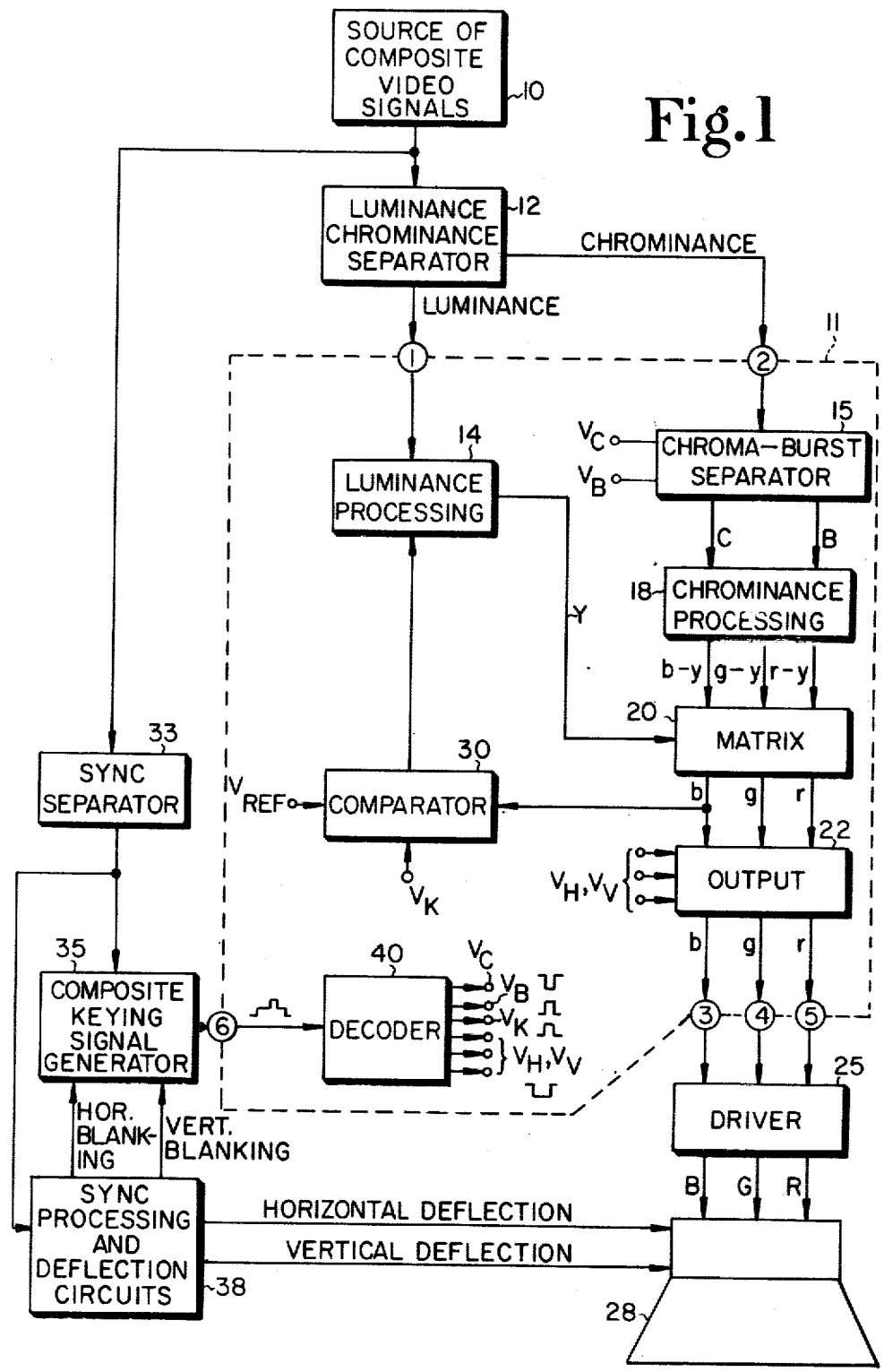

United States Patent [19]

Yost

[11] 4,313,130

[45] Jan. 26, 1982

[54] KEYING SIGNAL GENERATOR WITH FALSE OUTPUT IMMUNITY

[75] Inventor: Thomas D. Yost, Indianapolis, Ind.

[73] Assignee: RCA Corporation, New York, N.Y.

[21] Appl. No.: 182,753

[22] Filed: Aug. 29, 1980

[51] Int. Cl.³ .................. H04N 5/44; H04N 9/46
[52] U.S. Cl. .................. 358/21 R; 358/20; 358/172; 358/178
[58] Field of Search ............ 358/19, 20, 21 R, 160, 358/172, 178

[56] References Cited

U.S. PATENT DOCUMENTS

| | | | |
|---|---|---|---|
| 3,268,656 | 8/1966 | Hansen | 358/20 |
| 4,213,151 | 7/1980 | Harford | 358/178 |
| 4,263,610 | 4/1981 | Shanley et al. | 358/20 |

*Primary Examiner*—Robert L. Richardson
*Attorney, Agent, or Firm*—Eugene M. Whitacre; Paul J. Rasmussen; Ronald H. Kurdyla

[57] ABSTRACT

A circuit for generating a composite keying signal comprises a gate pulse generating circuit and a voltage translating network in a television receiver also including keyed video signal processing circuits. The composite keying signal comprises a first pulse developed by the translating network during horizontal blanking intervals of the video signal, and a second pulse developed by the gate circuit during a portion of the horizontal blanking intervals and superimposed on the first pulse. An output of the gate circuit is clamped during picture intervals to a fixed voltage via a low impedance clamping path that exhibits current conduction capability greater than the output current conduction capability of the gate pulse generating circuit. The clamping action prevents improper keying of the keyed circuits in response to false keying signals such as may be generated in response to spurious signals occurring during picture intervals of the television signal.

14 Claims, 2 Drawing Figures

KEYING SIGNAL GENERATOR WITH FALSE OUTPUT IMMUNITY

This invention concerns a circuit arrangement for developing a keying signal such as a composite signal from which multiple keying signals can be derived, for use in a television receiver including keyed circuits. In particular, the invention concerns an improvement of such a circuit as disclosed in a copending U.S. patent application Ser. No. 113,371 of R. L. Shanley, II, et al. entitled "Controlled Output Composite Keying Signal Generator For A Television Receiver," and now U.S. Pat. No. 4,263,610, wherein the circuit output is controllably suppressed during picture intervals of the video signal to inhibit false output keying signals such as may occur during the picture intervals.

In a color television receiver for processing a composite color television signal including luminance, chrominance and synchronizing signal components, there is a need for signal processing functions that require keying or synchronization with respect to the composite television signal. In pertinent part, these functions include keying to separate the burst and chrominance information components of the composite signal, keying a blanking level clamp during image blanking intervals to establish a black reference level for a displayed picture, and keying during horizontal and vertical retrace blanking intervals to inhibit image display during these intervals.

When keyed luminance or chrominance signal processing circuits of the receiver are contained within an integrated circuit in whole or in significant part, it is desirable to provide a single, composite keying signal from which signals for performing the described keying functions can be derived. A single, composite keying signal of this type is desirable since only a single external keying signal input terminal of the integrated circuit is then required. Also, an integrated circuit incorporating a composite keying signal generator requires only one output terminal for providing the composite keying signal.

Such a composite keying signal is known, and if often referred to as a "sandcastle" signal because of its configuration. The sandcastle keying signal typically comprises a first pulse component of a given width, and a second pulse component of lesser width superimposed on the first pulse component. The first and second pulse components exhibit given amplitudes and timing in accordance with the keying and synchronizing requirements of signal processing circuits within the receiver.

In accordance with the principles of the present invention, it is herein recognized as being desirable to prevent improper keying of the keyed receiver circuits in response to a keying signal of the type described above. Such improper keying can occur if the keying signal generator is caused to produce an output keying signal during picture intervals of the video signal. This may occur, for example, in response to spurious signals such as noise and other effects occurring during the picture interval.

Keying apparatus according to the present invention is included in a television receiver for processing a composite television signal containing image information occurring during periodic image intervals, and horizontal synchronizing information occurring during periodic horizontal image blanking intervals. The receiver includes a network for providing a horizontal reference pulse representative of the horizontal synchronizing information, a source of horizontal timing signals with image and blanking components and subject to synchronization by the horizontal synchronizing information, and keyed signal processing circuits.

The keying apparatus generates keying signals during the horizontal blanking intervals, and includes a keyed circuit and a control circuit. The keyed circuit is coupled to the network which provides the horizontal reference pulse and is subject to switching between first and second switching states for generating the keying signals. The keyed circuit includes an output circuit coupled to a circuit point, and exhibits the second switching state during the appearance of each reference pulse. Keying signals developed by the keyed circuit are coupled from the circuit point to the keyed signal processing circuits. The control circuit is coupled to the circuit point and responds to the horizontal timing signals for inhibiting false keying signal outputs from the keyed circuit during the image intervals. The control circuit exhibits nonconductive and conductive states during the blanking and image intervals, respectively. The current conduction capability of the control circuit during image intervals substantially equals or exceeds the current conduction capability of the output circuit of the keyed circuit.

In accordance with a feature of the invention, the control circuit exhibits a lower impedance during the image intervals than the impedance presented by the output circuit when the keyed circuit exhibits the second switching state.

In accordance with another feature of the invention, the control circuit comprises a clamping network coupled between the circuit point and a point of reference potential. The keyed circuit and the clamping network are arranged so that currents conducted by the output circuit of the keyed circuit in response to false keying signals, when present during image intervals, are poled so as to reinforce clamping currents conducted by the clamping network during image intervals.

Figure 2:
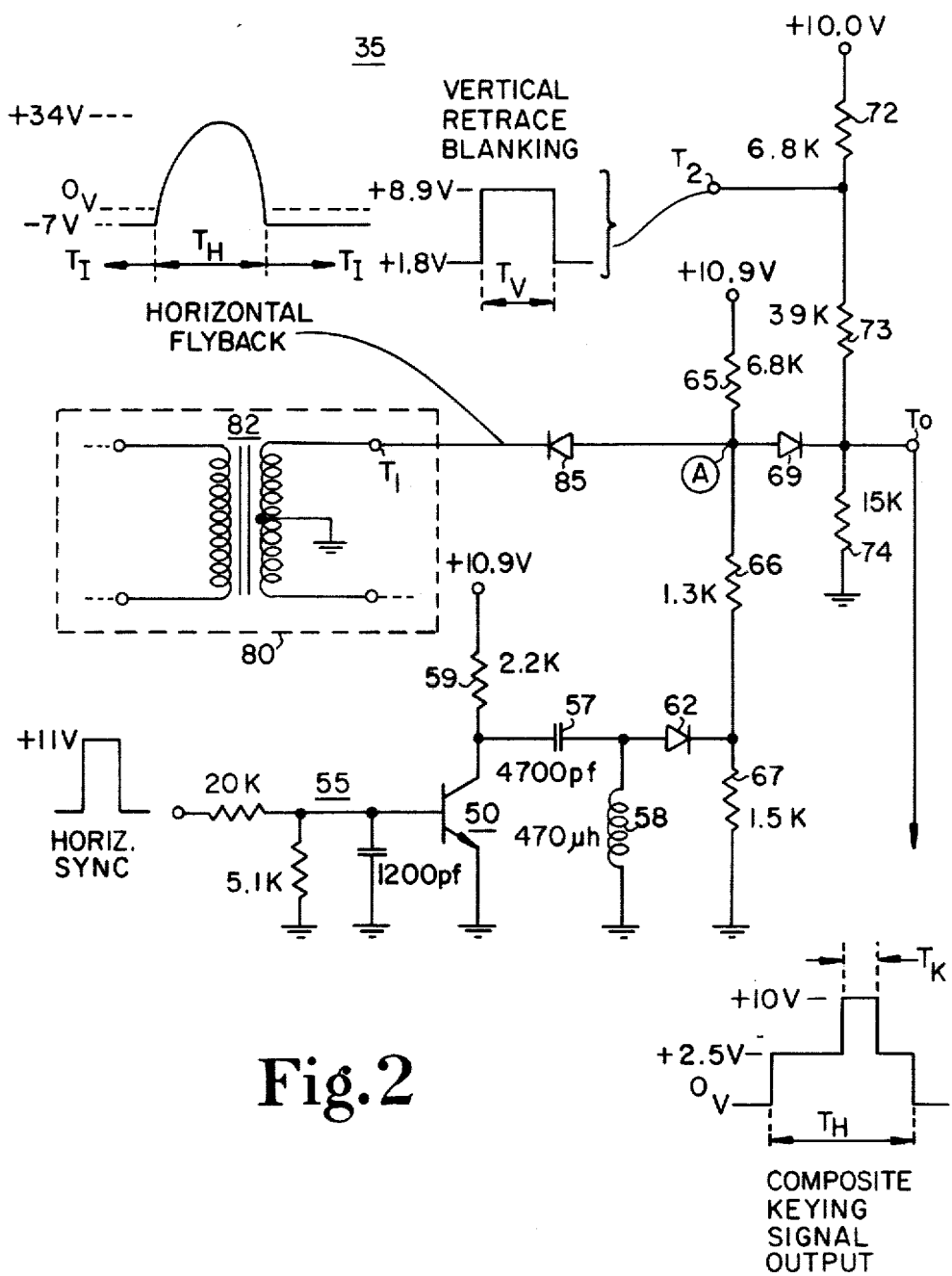

In the drawing:

FIG. 1 shows a block diagram of a system including a color television receiver comprising apparatus according to the present invention; and FIG. 2 illustrates a circuit diagram of a keying signal generator according to the invention.

In FIG. 1, a source of composite color television signals 10, (e.g., including RF and IF amplifier and video detector stages of a color television receiver) supplies signals to a luminance-chrominance signal separator 12. Separator 12 (e.g., a comb filter) separates the luminance and chrominance components of the composite television signal, and supplies these separated components to respective input terminals 1 and 2 of a luminance and chrominance signal processing network 11.

The separated luminance component is processed by a luminance signal processing unit 14 in a luminance channel of the receiver, including signal amplification and peaking stages for example. The separated chrominance component is supplied to a keyed chrominance-burst separator 15, which provides separated burst information (B) and chrominance picture interval information (C). Signal separation 15 can be of the type described in U.S. Pat. No. 4,038,681 of L. A. Harwood. The separated signals are then supplied to a chrominance signal processing unit 18 for developing r-y, g-y and b-y color difference signals as known. The color difference signals from unit 18 are combined with an amplified luminance output signal (Y) from unit 14 in a signal matrix 20, for developing output r, b and g color image signals.

The luminance channel also includes a blanking level clamp comprising a keyed comparator 30 which is keyed during the burst interval of each video signal horizontal blanking interval. When keyed, comparator 30 samples and compares a brightness reference voltage $V_{REF}$ with the D.C. level of the signal then appearing at the b (blue) signal output of matrix 20. An output signal from comparator 30 is supplied to a control input of luminance processor 14, for establishing the blanking level of the luminance signal (and thereby picture brightness) at a correct level in accordance with the level of voltage $V_{REF}$. The arrangement of comparator 30 with luminance processor 14 and matrix 20 is described in detail in U.S. Pat. No. 4,197,557 of A. V. Tuma, et al.

The r, g, b color signals from matrix 20 are separately coupled via plural output networks included in an output unit 22, to output terminals 3, 4 and 5 of network 11. The color signals are amplified individually by amplifiers within a kinescope driver stage 25 to provide high level output color signals R, G and B to respective intensity control electrodes of a color image reproducing kinescope 28.

Signals from source 10 are also supplied to a sync separator 33 for deriving the horizontal line synchronizing (sync) component of the television signal. The derived sync component is supplied from an output of sync separator 33 to sync processing and deflection circuits 38. Circuits 38 provide horizontal and vertical deflection signals for application to deflection control circuits of receiver kinescope 28, and vertical and horizontal (flyback) blanking signals.

A composite keying signal generator 35 responds to output signals from sync separator 33, and to horizontal and vertical retrace blanking signals from deflection circuits 38. A composite ("sandcastle") keying signal output from generator 35 is supplied via a terminal 6 to a signal decoder 40, which decodes the composite keying signal into separate keying pulses $V_b$, $V_C$, $V_K$ and $V_H$, $V_V$ as required by keyed signal processing circuits within network 11. Decoder 40 is shown in detail in copending U.S. patent application Ser. No. 113,371 of R. L. Shanley, II, et al. noted previously.

Keying pulses $V_B$ and $V_C$ encompass the burst interval and exhibit a mutually antiphase (push-pull) relationship, and are applied to keying inputs of chromaburst separator 15. Keying pulse $V_K$ is in-phase with and of the same (positive) polarity as pulse $V_B$, and is applied to a keying input of comparator 30. Plural keying pulses $V_H$, $V_V$ occur during each horizontal and vertical image retrace interval, and are applied to respective plural keying inputs of output stage 25.

In the arrangement of FIG. 1, the blocks within network 11 are largely capable of being fabricated as a single integrated circuit. In such case, terminals 1–6 correspond to external connecting terminals of the integrated circuit.

FIG. 2 shows a circuit arrangement of composite keying signal generator 35 in FIG. 1. In circuit 35, a base input of a normally nonconductive switching transistor 50 receives positive horizontal sync pulses from the output of sync separator 33 via an input coupling and timing network 55. A resonant circuit comprising a capacitor 57 and an inductor 58 is included in the collector output circuit of transistor 50 together with a load resistor 59. As disclosed in U.S. Pat. No. 4,051,518—Sendelweck, the resonant circuit is excited into ringing at its natural frequency when transistor 50 is keyed to conduct. The period of the ringing signal is determined by the values of capacitor 57 and inductor 58. A resulting output ringing signal in the collector circuit of transistor 50 coacts with the inverse conduction characteristic of transistor 50 to turn off transistor 50 prior to the completion of one full cycle of ringing, so that a positive burst gate pulse produced at the junction of capacitor 57 and inductor 58 corresponds to the first full half cycle (of positive polarity) of the ringing signal. The positive output pulse occurs over interval $T_K$ within horizontal retrace interval $T_H$, and encompasses the burst interval.

The output gate pulse provided by transistor 50 is coupled to a signal combining point A via a diode 62 and a resistor 66 included in the output circuit of the gate pulse generator comprising transistor 50. Signals developed at point A are coupled to an output terminal $T_O$ of circuit 35 via a diode 69.

A network 80 including a horizontal flyback transformer 82 provides a horizontal timing signal including positive horizontal flyback pulses during each horizontal retrace blanking interval $T_H$ (encompassing interval $T_K$). Transformer 82 includes a primary winding and a secondary winding with a grounded center tap. The flyback signal appears at a terminal $T_1$ of the secondary winding.

A diode 85 in the flyback signal path is rendered nonconductive during each horizontal blanking interval $T_H$ in response to the positive flyback pulse during interval $T_H$. Circuit 35 then produces a first voltage level at point A. The gate pulse from transistor 50 also occurs within blanking interval $T_H$, during interval $T_K$, and combines with the first voltage level to develop a composite ("sandcastle") keying signal at point A. The composite keying signal is coupled via diode 69 to an output terminal $T_O$ of circuit 35. A first signal translating voltage divider comprising resistors 65, 66, 67 and a second signal translating voltage divider including resistors 72, 73, 74 are included to establish appropriate levels of the composite keying signal that appears at output terminal $T_O$.

Thus the composite output keying signal developed by circuit 35 includes first and second pulse components. During each horizontal retrace blanking interval $T_H$, the first (lower) pulse with a blanking pedestal level of approximately +2.5 volts is produced in response to the positive flyback pulse that renders diode 85 nonconductive. The gate pulse output of transistor 50 comprises a second (upper) pulse component of the composite keying signal. The second pulse is superimposed on the first pulse component during interval $T_K$.

Analogous observations pertain with respect to generating a composite vertical blanking signal during vertical blanking interval $T_V$. During each vertical retrace blanking interval $T_V$, a positive-going vertical blanking pulse is coupled to a terminal $T_2$. This pulse is translated by voltage divider 72, 73, 74 so that a voltage then developed at output terminal $T_O$ corresponds to the desired pedestal level of the lower pulse component for vertical blanking purposes. The waveforms of composite keying signals developed for horizontal and vertical purposes are shown in detail in aforementioned U.S. patent application Ser. No. 113,371 of R. L. Shanley.

The gate pulse generating circuit comprising transistor 50 can undesirably be caused to generate a false output gate pulse in response to spurious input signals that may appear during picture intervals ($T_I$) of the video signal. Such spurious signals can include thermal noise, and other forms of noise that may be associated with the video signal and appear at the output of sync separator 33 (FIG. 1). Significant levels of output current can be associated with the false gate pulse, since in this example the output circuit of transistor 50 is capable of sourcing peak output currents on the order of ten milliamperes. Such currents are associated with the output ringing waveform developed when resonant circuit 57, 58 is excited into ringing by the conduction of transistor 50. False output gate pulses are inhibited in the following manner.

During each horizontal picture interval $T_I$, the signal from flyback transformer 82 exhibits a negative voltage (approximately −7 volts) sufficient to forward bias diode 85 into conduction. When conducting, diode 85 serves to clamp circuit point A (through which output gate pulses from transistor 50 pass) to a voltage of approximately −6.3 volts. Therefore, any false gate pulses generated during the picture intervals are also clamped to this level, which in this example is insufficient to cause decoder 40 (FIG. 1) to generate improperly timed keying signals $V_B$, $V_C$ and $V_K$.

Diode 85 is included in a clamping path between point A and ground via terminal $T_1$ and the grounded center tap secondary winding of transformer 82. Clamp diode 85 represents a switch arranged in series with the source of flyback switching signals between point A and ground.

The clamping current path exhibits a very low impedance (i.e., a few ohms) relative to the impedance presented by the output circuit of gate pulse generator transistor 50 when conductive during the picture intervals (approximately 450 ohms). In this regard, it is noted that the current conduction capability of the clamping path between point A and ground is greater than the output current conduction capability of the gate pulse generating circuit including transistor 50. This result is a function of the effective impedance of the clamping path compared to the effective output impedance of the gate pulse generating circuit, and of the amplitude of the flyback switching signal during picture intervals compared to the amplitude of the gate pulses capable of being generated by transistor 50 (approximately +8.0 volts in this example).

More specifically, in this example the keyed signal processing circuits that respond to keying signals supplied via terminal $T_O$ are enabled to operate when the level of the keying pulse generated during keying interval $T_K$ exceeds an output threshold level of approximately +1.5 volts at terminal $T_O$ of circuit 35. Therefore in order to prevent false picture interval keying pulses from being supplied via terminal $T_O$, the voltage at point A must be held to a level substantially equal to or less than a threshold level of approximately +2.2 volts (the +1.5 volt output threshold level plus the offset voltage of diode 69) during picture intervals. This result is accomplished when the following relationship is satisfied:

$$V_A = (R_C V_{BG} - R_{BG} V_C)/(R_C + R_{BG}) \leq V_T$$

where $V_A$ is the voltage at point A, $V_T$ is the threshold voltage that must not be exceeded at point A, $V_{BG}$ is the magnitude of output gate pulses capable of being generated by the burst gate pulse generator circuit including transistor 50, $V_C$ is the clamping voltage developed at point A by the clamp network including diode 85, $R_{BG}$ is the effective output impedance of the burst gate pulse generator circuit; and $R_C$ is the effective impedance of the clamping circuit including diode 85.

Accordingly, the clamping current path is capable of conducting away ("sinking") from point A those currents that are expected to be conducted ("sourced") from the output circuit of the gate pulse generator when false picture interval gate pulses are generated. Circuit point A therefore remains clamped and false gate pulses are prevented from passing to output terminal $T_O$.

It is also noted that the above result is aided by the manner in which clamping currents conducted by diode 85 and (false) output gate pulse currents conducted by resistor 66 during picture intervals are poled. Specifically, clamping currents flow from point A to ground via diode 85. Gate pulse current flows to point A so that this current adds to rather than subtracts from the clamping current. Consequently, the gate pulse current does not oppose the clamping current, and desirably serves to assure that the clamping current is maintained above a minimum level rather than diminished.

What is claimed is:

1. In a television receiver for processing a composite television signal containing image information occurring during periodic horizontal image intervals and horizontal synchronizing information occurring during periodic horizontal image blanking intervals; said receiver including means for providing a horizontal reference pulse representative of said horizontal synchronizing information; means for providing a horizontal timing signal comprising image and blanking interval components subject to synchronization by said horizontal synchronizing information; and keyed signal processing circuits; apparatus for generating an output keying signal during said blanking intervals, said apparatus comprising:

keyed means, subject to switching between first and second switching states and coupled to said horizontal reference pulse providing means, for generating said keying signal, said keyed means including an output circuit coupled to a circuit point and exhibiting said second switching state during each reference pulse appearance;

means for coupling keying signals from said circuit point to said keyed signal processing circuits; and control means coupled to said circuit point and responsive to said horizontal timing signal for inhibiting false keying signal outputs from said keyed means during said image intervals, said control means exhibiting a nonconductive condition during said blanking intervals, and exhibiting a conductive condition during said image intervals; and wherein the current conduction capability of said control means during said image intervals substantially equals or exceeds the current conduction capability of said output circuit of said keyed means.

2. Apparatus according to claim 1, wherein:

said control means exhibits a lower impedance during said image intervals than the impedance presented by said output circuit when said keyed means exhibits said second switching state.

3. Apparatus according to claim 1, wherein:
said control means comprises controllable conduction clamping means included in a clamping current path coupled between said circuit point and a point of reference potential, said clamping current path exhibiting a lower impedance during said image intervals than the impedance presented by said output circuit when said keyed means exhibits said second switching state.

4. Apparatus according to claim 3, wherein:
said clamping means and said means for providing said horizontal timing signals are arranged in series between said circuit point and a point of reference potential.

5. Apparatus according to claim 3 or 4, wherein:
said keyed means and said clamping means are arranged so that currents conducted by said output circuit of said keyed means in response to false keying signals, when present during said image intervals, are poled so as to reinforce currents conducted by said clamping means during said image intervals.

6. In a television receiver for processing a composite television signal containing image information occurring during periodic horizontal image intervals and horizontal synchronizing information occurring during periodic horizontal image blanking intervals, said receiver including means for providing a horizontal reference pulse representative of said horizontal synchronizing information; means for providing a horizontal timing signal comprising image and blanking interval components subject to synchronization by said horizontal synchronizing information; and keyed signal processing circuits; apparatus for generating a keying signal during said blanking intervals; said apparatus comprising:
keyed means subject to switching between first and second switching states and coupled to said horizontal reference pulse providing means, for generating said keying signal, said keyed means including an output circuit coupled to a circuit point and exhibiting said second switching state during each reference pulse appearance;
means for coupling keying signals from said circuit point to said keyed signal processing circuits; and
clamping means responsive to said horizontal timing signal and included in a clamping conduction path between said circuit point and a point of reference potential for inhibiting false keying signal outputs from said keyed means during said image intervals, said clamping means exhibiting a nonconductive condition during said blanking intervals, and exhibiting a conductive condition during said image intervals; and wherein
said clamping means and said output circuit of said keyed means are coupled to said circuit point so that currents conducted by said output circuit of said keyed means in response to false keying signals, when present during said image intervals, are poled so as to reinforce currents conducted by said clamping means during said image intervals.

7. In a color television receiver for processing a composite color television signal containing image information occurring during periodic horizontal image intervals and synchronizing information occurring during periodic image blanking intervals, said synchronizing information including: a horizontal synchronizing component occurring during horizontal blanking intervals, and a color burst component occurring during a burst interval within horizontal blanking intervals; said receiver including means for providing a horizontal reference pulse representative of said horizontal synchronizing component; means for providing a horizontal timing signal comprising image and blanking interval components subject to synchronization by said horizontal synchronizing component; and keyed signal processing circuits; apparatus for generating an output composite keying signal comprising a first pulse substantially coincident with said horizontal blanking intervals and a second pulse superimposed on said first pulse and encompassing said burst interval, said apparatus comprising:
means responsive to said horizontal timing signal for generating said first pulse during said horizontal blanking intervals;
keyed means, subject to switching between first and second switching states and coupled to said horizontal reference pulse providing means for providing, via an output circuit, a pulse encompassing said burst interval and corresponding to said second pulse, said keyed means exhibiting said second switching state during each reference pulse appearance;
means for combining said first and second pulses to produce said composite keying signal at a circuit point;
means for coupling said composite keying signal from said circuit point to said keyed signal processing circuits; and
control means coupled to said circuit point and responsive to said horizontal timing signal for inhibiting false keying signal outputs from said keyed means during said image intervals, said control means exhibiting a nonconductive state during said blanking intervals, and exhibiting a conductive state during image intervals; and wherein
the currrent conduction capability of said control means during said image intervals substantially equals or exceeds the current conduction capability of said output circuit of said keyed means.

8. Apparatus according to claim 7, wherein:
said control means exhibits a lower impedance during said image intervals than the impedance presented by said output circuit of said keyed means when said keyed means exhibits said second switching state.

9. Apparatus according to claim 7, wherein:
said control means comprises controllable conduction clamping means included in a clamping current path coupled between said circuit point and a point of reference potential, said clamping current path exhibiting a lower impedance during said image intervals than the impedance presented by said output circuit of said keyed means when said keyed means exhibits said second switching state.

10. Apparatus according to claim 9, wherein:
a low impedance path is provided between said circuit point and a point of reference potential during said image intervals by the series combination of said clamping means and said means for providing said timing signal.

11. Apparatus according to claim 9 or 10, wherein:
said clamping means and said output circuit of said keyed means are coupled to said circuit point so that currents conducted by said output circuit of said keyed means in response to false keying signals, when present during said image intervals, are poled so as to reinforce currents conducted by said clamping means during said image intervals.

12. In a color television receiver for processing a composite color television signal containing image information occurring during periodic horizontal image intervals and synchronizing information occurring during periodic image blanking intervals, said synchronizing information including: a horizontal synchronizing component occurring during horizontal blanking intervals, and a color burst component occurring during a burst interval within horizontal blanking intervals; said receiver including means for providing a horizontal reference pulse representative of said horizontal synchronizing component; means for providing a horizontal timing signal comprising image and blanking interval components subject to synchronization by said horizontal synchronizing component; and keyed signal processing circuits; apparatus for generating an output composite keying signal comprising a first pulse substantially coincident with said horizontal blanking intervals and a second pulse superimposed on said first pulse and encompassing said burst interval, said apparatus comprising:

means responsive to said horizontal timing signal for generating said first pulse during said horizontal blanking intervals;

keyed means subject to switching between first and second switching states and coupled to said horizontal reference pulse providing means for providing, via an output circuit, a pulse encompassing said burst interval and corresponding to said second pulse, said keyed means exhibiting said second switching state during each reference pulse appearance;

means for combining said first and second pulses to produce said composite keying signal at a circuit point;

means for coupling said composite keying signal from said circuit point to said keyed signal processing circuits; and clamping means responsive to said horizontal timing signal and included in a clamping current conduction path between said circuit point and a point of reference potential for inhibiting false keying signal outputs from said keyed means during said image intervals, said clamping means exhibiting a nonconductive condition during said blanking intervals, and a conductive condition during said image intervals; and wherein said clamping means and said output circuit of said keyed means are coupled to said circuit point so that currents conducted by said output circuit in response to false keying signals, when present during said image intervals, are poled so as to reinforce currents conducted by said clamping means during said image intervals.

13. In a television receiver for processing a composite television signal containing image information occurring during periodic image intervals and horizontal synchronizing information occurring during periodic horizontal image blanking intervals, said receiver including means for providing a horizontal reference pulse representative of said horizontal synchronizing information; and signal processing circuits responsive to keying signals during said blanking intervals; apparatus for generating said keying signals, comprising:

a switching device operable between first and second switching states and coupled to said source of horizontal reference pulses for generating said keying signals, said switching device including an output circuit coupled to a circuit point via a keying signal conduction path and exhibiting said second switching state during each reference pulse appearance;

a horizontal timing network including a horizontal flyback transformer having a primary winding, and an output secondary winding for providing a horizontal flyback signal with image and blanking interval components and subject to synchronization by said horizontal synchronizing information; and a clamping network for inhibiting false keying signal outputs from said switching device during said image intervals, said clamping network comprising a unilateral current conducting clamping device included in a clamping conduction path comprising said secondary winding of said flyback transformer between said circuit point and a point of reference potential, said clamping device being rendered nonconductive in response to said blanking interval component of said flyback signal and being rendered conductive in response to said image interval component of said flyback signal; and wherein said clamping path conducts clamping current between said circuit point and said point of reference potential, and said keying signal path conducts current from said output circuit to said circuit point so that false keying signal currents conducted in response to false keying signals, when present during said image intervals, reinforce clamping currents conducted by said clamping path during said image intervals.

14. Apparatus according to claim 13, wherein:

said switching device comprises a transistor with a base input coupled to said source of horizontal reference pulses, and a collector-emitter path coupled to said output circuit; and said unilateral current conducting clamping device comprises a diode poled for forward current conduction from said circuit point to said point of reference potential via said transformer secondary winding.

* * * * *